US006859331B2

(12) United States Patent
Kurata

(10) Patent No.: US 6,859,331 B2
(45) Date of Patent: Feb. 22, 2005

(54) OBJECTIVE

(75) Inventor: Kiyonobu Kurata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/670,783

(22) Filed: Sep. 26, 2003

(65) Prior Publication Data

US 2004/0201900 A1 Oct. 14, 2004

(30) Foreign Application Priority Data

Sep. 27, 2002 (JP) ........................................ 2002-283921

(51) Int. Cl.$^7$ ........................ G02B 21/02; G02B 21/16; G02B 9/64; G02B 13/14
(52) U.S. Cl. ...................................... 359/656; 359/754
(58) Field of Search ............................... 359/656–660, 359/368, 754, 649, 650

(56) References Cited

U.S. PATENT DOCUMENTS

| 5,235,465 A | * | 8/1993 | Hayashi ...................... 359/659 |
| 6,507,442 B2 | * | 1/2003 | Kashima et al. ............ 359/656 |
| 2003/0197945 A1 | * | 10/2003 | Kurata ....................... 359/649 |

FOREIGN PATENT DOCUMENTS

JP 11167067 A * 6/1999 ........... G02B/21/02

* cited by examiner

Primary Examiner—Scott J. Sugarman
Assistant Examiner—Deborah Raizen
(74) Attorney, Agent, or Firm—Pillsbury Winthrop LLP

(57) ABSTRACT

An objective has lens units, each of which is constructed with single lenses, and a numerical aperture of 0.7 or more, comprising, in order from the image side, a first lens unit including a positive meniscus lens with a convex surface facing the image side, at least two negative lenses, and at least two positive lenses, and having negative power as a whole; a second lens unit including a negative lens and a positive lens so that the radius of curvature of the surface of the negative lens, adjacent to the positive lens, is smaller than that of the opposite surface thereof; a third lens unit including biconvex positive lenses and biconcave negative lenses which have different media, so that two of the biconvex positive lenses are arranged on the object side and the image side, and having positive power as a whole; and a fourth lens unit including a negative meniscus lens and at least one positive meniscus lens, and having positive power as a whole. In this case, the objective satisfies the following condition:

$$0 < |Rmin/Rmax| < 0.5$$

where Rmin is the radius of curvature of the surface of the negative lens, adjacent to the positive lens, in the second lens unit and Rmax is the radius of curvature of the opposite surface thereof.

8 Claims, 13 Drawing Sheets

OBJECTIVE

BACKGROUND OF THE INVENTION

1. Field of the Invention

This invention relates to a microscope objective, and in particular, to a high-NA, high-magnification, and infinity-correction type objective used in a deep ultraviolet region corresponding to a wavelength of approximately 250 nm.

2. Description of Related Art

It is known that objectives used in a deep ultraviolet (DUV) region corresponding to a wavelength of approximately 250 nm are roughly divided into three types. The first type objective is constructed with only a plurality of lenses made with the same medium (quartz, mostly), and is designed so that chromatic aberration cannot be corrected in theory (refer to, for example, Japanese Patent Kokai Nos. Hei 6-242381 and Hei 10-104510). The second type objective is constructed so that lenses made with different media (quartz and fluorite, mostly) are cemented together with an adhesive and chromatic aberration can be corrected (refer to, for example, Japanese Patent Kokai Nos. Hei 5-72482, Hei 9-243923, Hei 11-249025, and 2001-42224). The third type objective is designed so that, of a plurality of lenses, a lens made of quartz and a lens of fluorite are used to correct chromatic aberration, but so that both lenses are not cemented with the adhesive (refer to, for example, Japanese Patent Kokai Nos. Hei 11-167067 and 2001-318317).

The resolution of a microscope is fundamentally determined by a wavelength and the numerical aperture of the objective. The median wavelength of visible light used in an ordinary microscope is approximately 550 nm and the maximum numerical aperture of a dry objective is about 0.9. Therefore, when a wavelength to be used is set to around 250 nm, the resolution is roughly doubled because the wavelength is halved. However, this is limited to the case where the numerical aperture remains unchanged. With a wavelength of about 0.4, even though the wavelength to be used is set to around 250 nm, both the wavelength and the numerical aperture are halved, and thus the resolution is counteracted and is exactly the same as in a conventional microscope.

SUMMARY OF THE INVENTION

The objective according to the present invention has lens units, each of which is constructed with single lenses, and a numerical aperture of 0.7 or more, comprising, in order from the image side, a first lens unit including a positive meniscus lens with a convex surface facing the image side, at least two negative lenses, and at least two positive lenses, and having negative power as a whole; a second lens unit including a negative lens and a positive lens so that the radius of curvature of the surface of the negative lens, adjacent to the positive lens, is smaller than that of the opposite surface thereof; a third lens unit including biconvex positive lenses and biconcave negative lenses which have different media, so that two of the biconvex positive lenses are arranged on the object side and the image side, and having positive power as a whole; and a fourth lens unit including a negative meniscus lens and at least one positive meniscus lens, and having positive power as a whole. In this case, the objective satisfies the following condition:

$$0<|Rmin/Rmax|<0.5 \qquad (1)$$

where Rmin is the radius of curvature of the surface of the negative lens, adjacent to the positive lens, in the second lens unit and Rmax is the radius of curvature of the opposite surface thereof.

According to the present invention, the objective preferably satisfies the following condition:

$$1<|FL2/FL3| \qquad (2)$$

where FL2 is the focal length (mm) of the second lens unit and FL3 is the focal length (mm) of the third lens unit.

According to the present invention, the objective preferably satisfies the following condition:

$$-1.5<FL1/FL234<-1 \qquad (3)$$

where FL1 is the focal length (mm) of the first lens unit and FL234 is a synthesized focal length (mm) of the second to fourth lens units.

According to the present invention, each of the first, third and fourth lens units preferably has air spacing between the positive lens and the negative lens of different media and the objective satisfies the following conditions:

$$d/L<0.025 \qquad (4)$$

$$0.58<Rp/Rn<1.73 \qquad (5)$$

where L is a parfocal distance (mm) of the objective, d is the air spacing (mm), Rp is the radius of curvature of a surface with positive power, of the positive and negative lenses facing each other with air spacing between them, and Rn is the radius of curvature of a surface with negative power thereof. Also, the distance L in this condition is defined as the overall length of the objective, but when the parfocal distance of the objective is nearly equal to the overall length of the objective, the parfocal distance of the objective may be used as the distance L. Here, the overall length of the objective refers to a distance from the first lens surface to the last lens surface.

According to the present invention, glass materials used for the objective are preferably quartz and fluorite.

According to the present invention, at least one pair of lenses in which the negative lens and the positive lens of the third lens unit, different in medium, are arranged with air spacing between them are preferably such that the negative lens and the positive lens are constructed of quartz and fluorite, respectively.

According to the present invention, the objective preferably satisfies the following condition:

$$Ri<Ro \qquad (6)$$

where Ri is the radius of curvature of the image-side surface of at least one negative lens in the first lens unit and Ro is the radius of curvature of the object-side surface thereof.

According to the present invention, the objective preferably satisfies the following condition:

$$|DUVfp-IRfp| \leq 12 \, \mu m \qquad (7)$$

where DUVfp is an imaging position on the object side in a deep ultraviolet region and IRfp is an imaging position on the object side of the wavelength in an infrared region.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
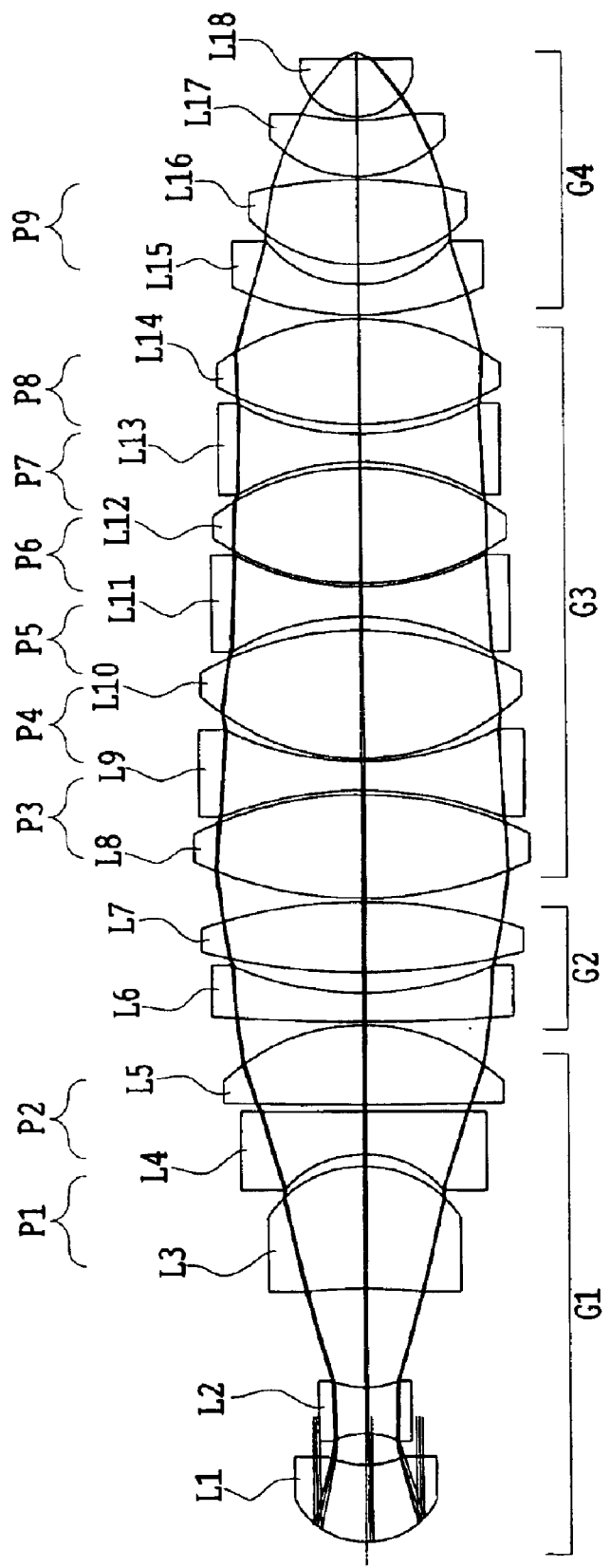
FIG. 1 is a view showing a lens arrangement of a first embodiment in the present invention.

Before undertaking the description of the embodiments, the function and effect of the present invention will be explained below.

The objective of the present invention is constructed with single lenses, without cementing lenses of different media with adhesives. According to the present invention, chromatic aberration can be corrected, and the problem encountered in the use of the adhesives can be clarified. Further, it is possible to obtain the resolution corresponding to the wavelength of approximately 250 nm and a high numerical aperture. Still further, active AF using infrared light becomes possible and thereby it is possible to provide a deep-ultraviolet microscope which has good operativeness and does not undergo the influence of a manufacturing error.

The first lens unit of the present invention includes, in order from the image side, a positive meniscus lens with a convex surface facing the image side, at least two negative lenses, and at least two positive lenses, having negative power as a whole. A lens with strong negative power is placed in the first lens unit to perform the function that emerging rays on the image side are rendered parallel and at the same time, to correct curvature of field and coma such as off-axis aberrations. Since a simple placement of only a lens with negative power fails to hold the balance between aberrations, the positive meniscus lens with the convex surface facing the image side and the biconcave negative lens with strong negative power are arranged and thereby a Gauss lens system is provided so that curvature of field and chromatic aberration of magnification are corrected in a good balance as a whole. At least one pair of lenses constructed by arranging the negative lens and the positive lens of different media with air spacing between them are provided to thereby correct on-axis and off-axis aberrations including chromatic aberration which cannot be completely corrected by the second to fourth lens units.

The second lens unit includes a negative lens and a positive lens. The radius of curvature of the surface of the negative lens, adjacent to the positive lens in the same lens unit, is smaller than that of the opposite surface thereof. It is for this reason that the second lens unit is caused to perform the function that spherical aberration and coma, produced in the third and fourth lens units, are neutralized by spherical aberration and coma, produced in a reverse direction. In particular, when the radius of curvature of the surface of the negative lens, adjacent to the positive lens, is reduced, spherical aberration is easily produced in the reverse direction with respect to the third and fourth lens units, and therefore, the function described above can be performed. Condition (1) prescribes correction for such aberrations. Beyond the upper limit of 0.5, the effect of correction for aberration is lessened and spherical aberration produced in the third or fourth lens unit cannot be completely corrected.

The third lens unit includes biconvex positive lenses and biconcave negative lenses which have different media so that two of the biconvex positive lenses are arranged on the object side and the image side, having positive power as a whole. Light emerging from the surface of a specimen passes through the fourth lens unit and is incident on the third lens unit by virtue of the spread of marginal rays caused at this time. In this case, however, if the third lens unit has the negative power, the rays will be further spread and a ray height (the width of the marginal ray in the Y direction from the optical axis) will be significantly increased. This means that the problem arises that the outside diameter of the lens is increased to raise the manufacturing cost and performance is liable to deteriorate because of the manufacturing error of the lens. In the present invention, therefore, the third lens unit has the positive power as a whole and the biconvex lenses are arranged on both the object and image sides, thereby reducing the height at which the marginal rays emerge from the fourth lens unit. That the ray height can be reduced is that a small outside diameter of the lens is satisfactory, and thus performance can be maintained with respect to the manufacturing error and a change in lens shape. In addition, the negative lens and the positive lens of different media are arranged, and thereby it becomes possible to correct chromatic aberration in a DUV wavelength region of 248 nm ± a few nm and on-axis chromatic aberration in an NIR (near-infrared) region used in active AF.

The fourth lens unit includes a negative meniscus lens and at least one positive meniscus lens and has positive power as a whole. The placement of the negative meniscus lens brings about the effect of correcting spherical aberration produced in the positive lens of the fourth lens unit. The fourth lens unit, as mentioned above, includes at least one positive meniscus lens and has the positive power as a whole, and thereby monochromatic aberration can be favorably corrected in the main. In the objective with a numerical aperture of 0.7 or more, notably, of the order of 0.9, unless an angle made by a ray emerging from the object is made small, even the monochromatic aberration ceases to be correctable. However, when at least one positive meniscus lens is used and the angle of the ray is gradually reduced, the correction becomes possible.

Condition (2) determines the ratio between the focal lengths of the second and third lens units. Below the lower limit of 1, the focal length of the third lens unit becomes greater than that of the second lens unit. In this case, the ray height in the third lens unit is increased and the outside diameter of the lens becomes large. As a result, the coefficient of correction for aberration of the third lens unit is increased, and the problem arises that the third lens unit is liable to undergo the influence of the manufacturing error.

Condition (3) determines the ratio between the focal length of the first lens unit and the synthesized focal length of the second to fourth lens units. Below the lower limit of −15, the focal length of the first lens unit contributing to correction for off-axis aberration is extremely increased, namely the negative power is extremely weakened, and hence correction for coma or curvature of field becomes difficult. Beyond the upper limit of −1, the focal length of the first lens unit becomes too small, namely the negative power becomes too strong, and thus the synthesized focal length of the second to fourth lens units is extremely increased, with the result that the positive power is lessened. Consequently, the ray height in the second to fourth lens units is increased, and the amount of production of aberration in each lens unit becomes appreciable.

The first, third, and fourth lens units are constructed with the negative lenses and the positive lenses which have different media. The objective of the present invention is based on the premise that its performance is exhibited at wavelengths of 248 nm ± a few nm so that the first lens unit is capable of correcting chromatic aberration of magnification and the third and fourth lens units are capable of correcting on-axis chromatic aberration.

Condition (4) determines the arrangement of lenses in close proximity. Beyond the upper limit of 0.025 of Condition (4), the air spacing between the lenses becomes too wide to favorably correct chromatic aberration. Condition (5) prescribed that the radii of curvature of opposite surfaces of a pair of lenses are made almost identical. When the objective satisfies Condition (5), aberrations including chromatic aberration can be favorably corrected. Outside the limit of this condition, correction for chromatic aberration becomes particularly difficult. That is, Conditions (4) and (5) are such that even though the adhesives are not used, the lenses are caused to falsely assume the same role as in cemented lenses, and spherical aberration and chromatic aberration are corrected.

In the objective, glass materials used for individual lenses are to be quartz and fluorite. Whereby, even though media with deliquescence and birefringence are not used, an objective for a deep ultraviolet region of wavelength about 250 nm, which is good in workability and durability and high in transmittance, can be obtained.

In the objective, the negative lens and the positive lens of different media in each of the first, third, and fourth lens units are arranged with air spacing between them. Of at least one pair of lenses constructed in this way, the negative lens is constructed of quartz and the positive lens of fluorite. Whereby, chromatic aberration of magnification in the first lens unit and aberrations including on-axis chromatic aberration in the third and fourth lens units can be more favorably corrected in the main.

In the objective, when an attempt is made to satisfy Condition (6) with respect to at least one negative lens in the first lens unit, a ray incident on the convex lens and the concave lens can be favorably bent.

Figure 13:
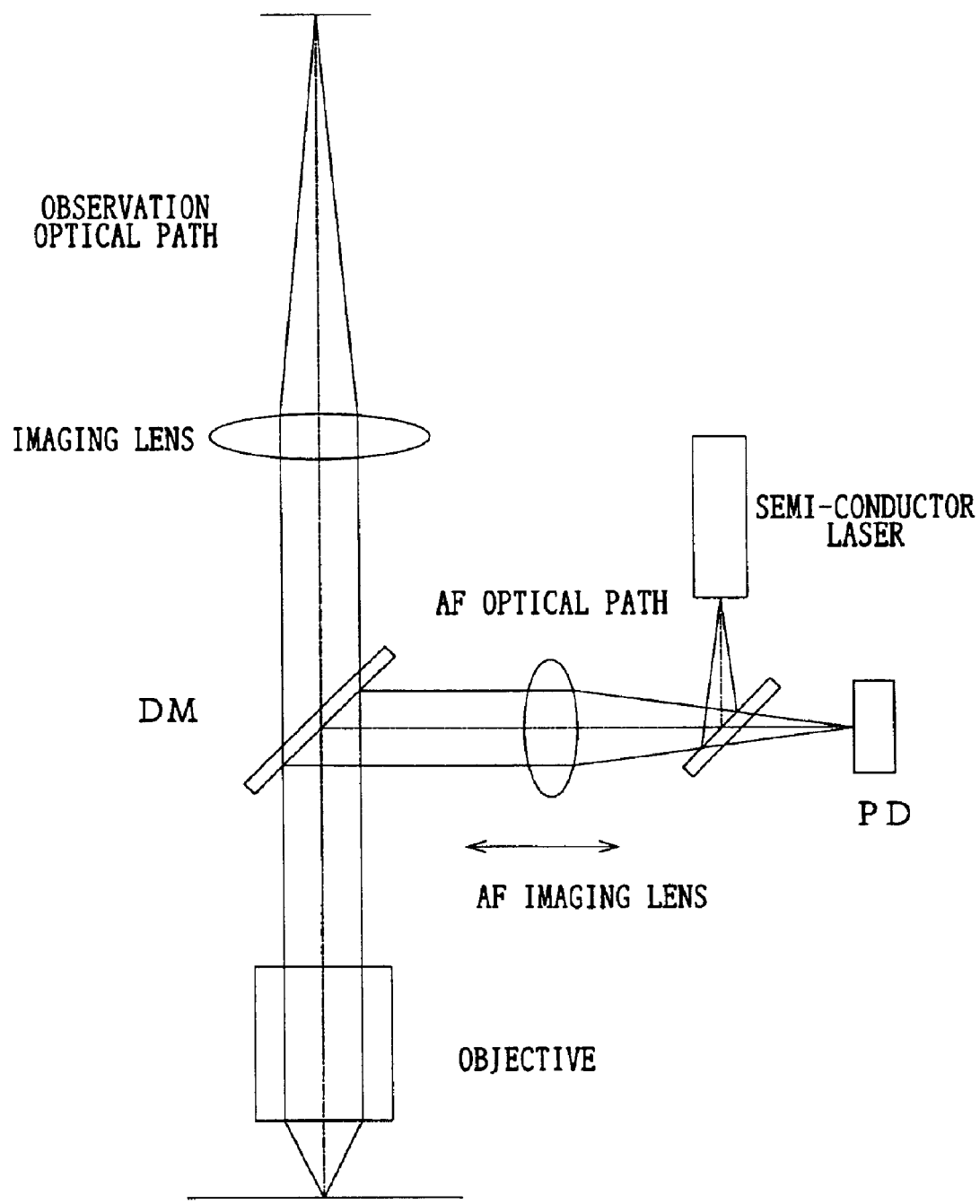
FIG. 13 is a view schematically showing an ordinary microscope provided with an AF device.

Condition (7) determines the amount of shift of the imaging position between the deep ultraviolet region (248 nm±5 nm) and the near-infrared region (wavelengths chiefly used for AF in a semiconductor laser are single wavelengths of 670–900 nm) on the object side. Rays emanating from the object are incident on the objective with a certain numerical aperture and become parallel light in the objective, and this light is imaged by an imaging lens. Generally, in the case of AF for microscopes, as shown in FIG. 13, a dichroic mirror DM reflecting only near-infrared light is placed at an angle of 45° with the optical axis, between the objective and the imaging lens. Visible light emerging from the objective passes through the dichroic mirror DM and is imaged by the observation-side imaging lens. Near-infrared light is reflected by the dichroic mirror DM and is imaged by an AF imaging lens. When the imaging position on the observation side coincides with that on the AF side, the imaging position on the object side is the same and therefore the AF by the near-infrared light becomes possible. Actually, however, some extent of on-axis chromatic aberration exists in the objective. In this case, the imaging position on the observation side cannot be shifted, but in order to shift the imaging position on the AF side to a preset imaging position, provision is made so that the AF imaging lens can be moved along the optical axis to some extent. For example, when an objective with a focal length of 1.8 mm and an imaging lens with a focal length of 180 mm are used, a 100× objective is obtained. Basically, the focal length of the AF imaging lens is often set to ½–¼ of the focal length of the observation-side imaging lens. The reason for this is that, with the same focal length as in the observation-side imaging lens, the amount of shift of the AF imaging lens is considerably increased.

For example, when it is assumed that a 100× objective with a focal length of 1.8 mm and an AF imaging lens with a focal length of 180 mm are used and the shift of the imaging position between visible light and near-infrared light on the object side is ±5 μm, the amount of shift on the AF side is given from the longitudinal magnification as $$\pm 0.005(mm) \times 100(\times) \times 100(\times) = \pm 50 \text{ mm}$$

With this value, it is impossible to obtain the amount of shift mentioned above because of the problems of apace and a lens driving motor. Thus, when the focal length of the AF imaging lens is set to ½–¼ of the focal length of the observation-side imaging lens, for example, when the focal length is 90 mm which is ½ thereof, the shift of the imaging position on the AF side is reduced to ¼ as follows:

$$\pm 0.005(mm) \times 50(\times) \times 50(\times) = \pm 12.5 \text{ mm}$$

In an ordinary objective in which the visible ray is chiefly used, the difference of wavelength is relatively small and the shift of the imaging position between visible light and near-infrared light on the object side is slight. The AF imaging lens thus requires a less amount of movement. However, since the objective for the deep ultraviolet region of the present invention is used on the basis of a wavelength of approximately 250 nm, the difference with the wavelength of near-infrared light is more than twice. Condition (7) solves this problem. Beyond the upper limit of Condition (7), the amount of movement of the AF imaging lens is extremely increased and the shift cannot be completely corrected by the AF imaging lens.

The embodiments of the present invention will be described below with reference to FIGS. 1–12. In each of the embodiments of the present invention, the focal length of the objective is 1.8 mm and the range of correction wavelengths in the deep ultraviolet region is 248 nm±5 nm, and when the objective is combined with the imaging lens with a focal length of 180 mm, a field number of 5 mm and a magnification of 100× are obtained. Since chromatic aberration is corrected in the limit of the wavelength region of 248 nm±5 nm, it is possible to use a combination with a KrF excimer laser which is not in a narrow region. Moreover, since the adhesive is not used, the objective exhibits sufficient resistance to a high-energy laser. Also, when the objective is combined with a band-pass filter with a half-width of about 7 nm, it is possible to illuminate and observe a specimen with a mercury lamp as the pre-stage of laser irradiation. By suppressing the shift of the imaging position on the object side of the deep ultraviolet region and the infrared region, AF is possible.

In each of the embodiments, aberrations shown in the aberration diagram are relative to the surface of the object in reverse tracing of the single body of the objective and their dimensions are in millimeters and percents. For spherical aberration, a dotted line denotes 248 nm, a chain line denotes 243 nm, and a solid line denotes 253 nm.

First Embodiment

Figure 2:
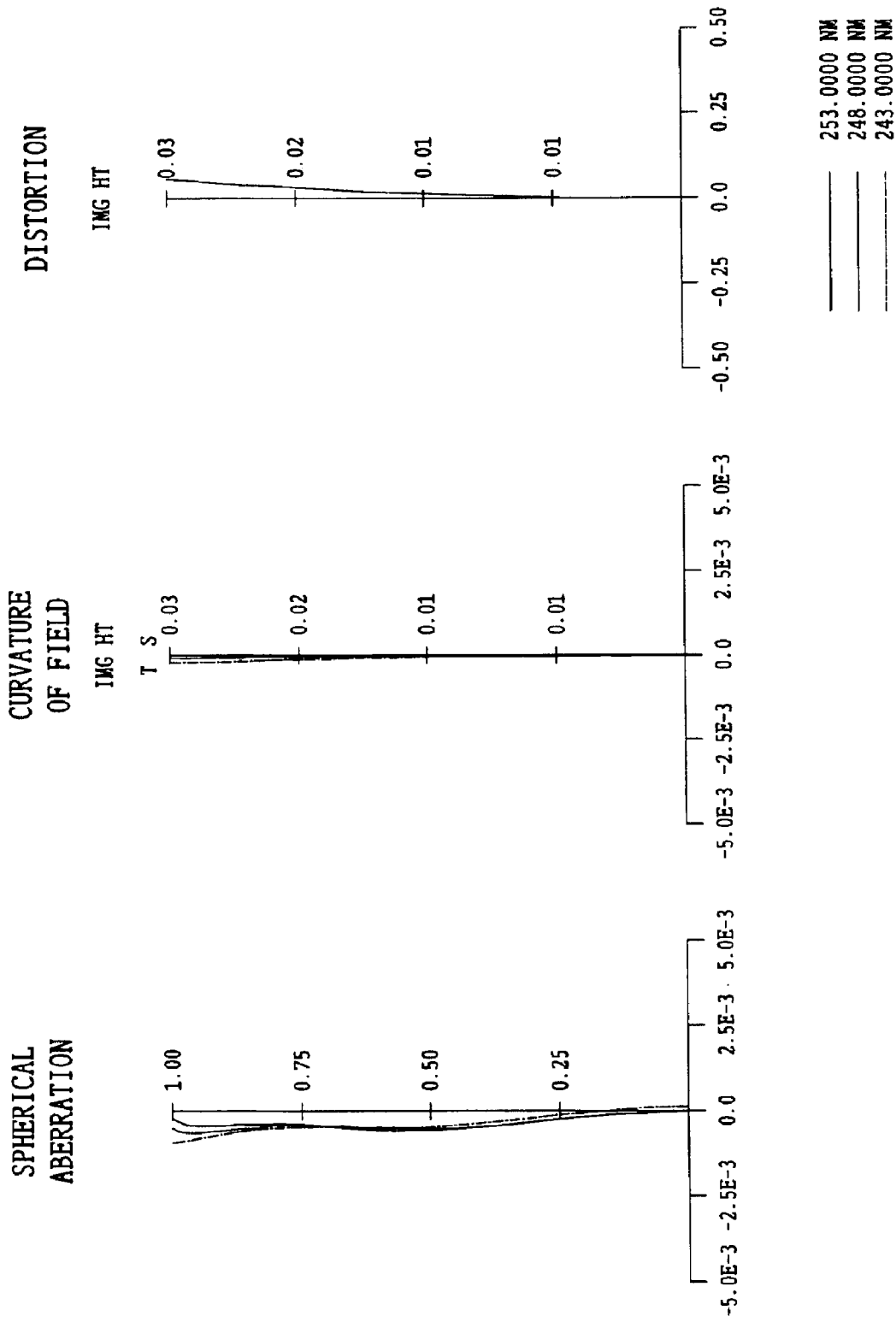
FIG. 2 is aberration diagrams of the first embodiment.

The lens arrangement of the first embodiment is shown in FIG. 1 and aberration characteristics are shown in FIG. 2. As will be obvious from FIG. 1, a first lens unit G1 of the first embodiment includes, in order from the image side, a positive meniscus lens L1 with a convex surface facing the image side, a negative lens L2, a positive lens L3, a negative lens L4, and a positive lens L5. Two pairs of lenses P1 and P2 are configured with three adjacent lenses L3–L5 to constitute a false cemented triplet, and the first lens unit G1 has negative power as a whole.

A second lens unit G2 includes a negative meniscus lens L6 with a concave surface facing the object side and a biconvex positive lens L7, and the radius of curvature of the surface of the negative lens L6, adjacent to the positive lens L7 in the same lens unit, is selected to be smaller than that of the opposite surface thereof.

A third lens unit G3 includes four biconvex positive lenses L8, L10, L12, and L14 and three biconcave negative lenses L9, L11, and L13 in which each of the biconvex positive lenses and each of the biconcave negative lenses have different media and are alternately arranged, so that the biconvex positive lenses L8 and L14 are arranged on the image side and the object side, respectively. In addition, six pairs of lenses P3, P4, P5, P6, P7, and P8 are configured with these seven adjacent lenses L8–L14 to constitute false cemented triplets, and the third lens unit G3 has positive power as a whole.

A fourth lens unit G4 includes a negative meniscus lens L15 with a concave surface facing the object side, a biconvex positive lens L16, and positive meniscus lenses L17 and L18, each with a convex surface facing the image side. The lenses L15 and L16 are configured as a pair of lenses P9 to constitute a false cemented doublet, and the fourth lens unit G4 has positive power as a whole.

As will be evident from Data 1 to be described below, the first embodiment satisfies Conditions (1), (2), (3), and (6), the pairs of lenses P1–P6 satisfy Conditions (4) and (5), and the imaging position of wavefront aberration on the object side in the deep ultraviolet region and the infrared region satisfies Condition (7).

Data 1
Parfocal distance = 45 mm
Range of correction for aberration in deep ultraviolet region = 248 nm ± 5 nm
NA = 0.9
WD = 0.2

| Surface number | RDY | THI | Medium | Condition (4) | Condition (5) |
|---|---|---|---|---|---|
| 1 | INFINITY | −4 | | | |
| 2 | 2.48717 | 2.473969 | Quartz L1 | | |
| 3 | 2.70108 | 1 | | | |
| 4 | −2.27772 | 1.490233 | Quartz L2 | | |
| 5 | 2.67967 | 3.214262 | | | |
| 6 | −15.64714 | 3.982066 | Fluorite L3 | | |
| 7 | −3.66338 | 0.434784 | P1 | 0.0097 | 1.127 |
| 8 | −3.25138 | 1.341504 | Quartz L4 | | |
| 9 | 228.14528 | 0.232865 | P2 | 0.0052 | 0.633 |
| 10 | 144.4742 | 2.659426 | Fluorite L5 | | |
| 11 | −6.35714 | 0.1 | | | |
| 12 | 56.51823 | 1 | Quartz L6 | | |
| 13 | 9.57308 | 0.703382 | | | |

-continued

Data 1
Parfocal distance = 45 mm
Range of correction for aberration in deep ultraviolet region = 248 nm ± 5 nm
NA = 0.9
WD = 0.2

| Surface number | RDY | THI | Medium | Condition (4) | Condition (5) |
|---|---|---|---|---|---|
| 14 | 18.84184 | 2.359018 | Fluorite L7 | | |
| 15 | −15.54698 | 0.1 | | | |
| 16 | 11.87056 | 3.506388 | Fluorite L8 | | |
| 17 | −11.87056 | 0.131926 | P3 | 0.0029 | 0.957 |
| 18 | −12.39959 | 1 | Quartz L9 | | |
| 19 | 9.49874 | 0.1 | P4 | 0.0022 | 0.775 |
| 20 | 7.36111 | 4.249929 | Fluorite L10 | | |
| 21 | −10.45746 | 0.47826 | P5 | 0.0106 | 1.291 |
| 22 | −8.10095 | 1 | Quartz L11 | | |
| 23 | 8.10095 | 0.1 | P6 | 0.0022 | 0.976 |
| 24 | 7.90936 | 3.821471 | Fluorite L12 | | |
| 25 | −7.90936 | 0.2 | P7 | 0.0044 | 1.013 |
| 26 | −7.80576 | 0.96 | Quartz L13 | | |
| 27 | 7.80576 | 0.311743 | P8 | 0.0069 | 1.140 |
| 28 | 8.89943 | 3.449933 | Fluorite L14 | | |
| 29 | −7.92049 | 0.1 | | | |
| 30 | 9.15314 | 1 | Quartz L15 | | |
| 31 | 3.68027 | 0.64784 | P9 | 0.0144 | 1.286 |
| 32 | 4.7319 | 2.751027 | Fluorite L16 | | |
| 33 | −15.69583 | 0.1 | | | |
| 34 | 3.66954 | 1.798802 | Fluorite L17 | | |
| 35 | 7.20788 | 0.1 | | | |
| 36 | 1.8327 | 1.853224 | Quartz L18 | | |
| 37 | 15.44227 | 0.247948 | | | |

FL1 = −14.122
FL2 = 74.671
FL3 = 18.602
FL234 = 11.767
Rmin = 9.57308
Rmax = 18.84184

| wavelength used for AF | Imaging shift at the best position of wavefront aberration on the object side between 248 nm and each wavelength used for AF |
|---|---|
| 670 nm | +4.60 μm |
| 785 nm | +0.19 μm |
| 900 nm | −5.64 μm |

Second Embodiment

Figure 3:
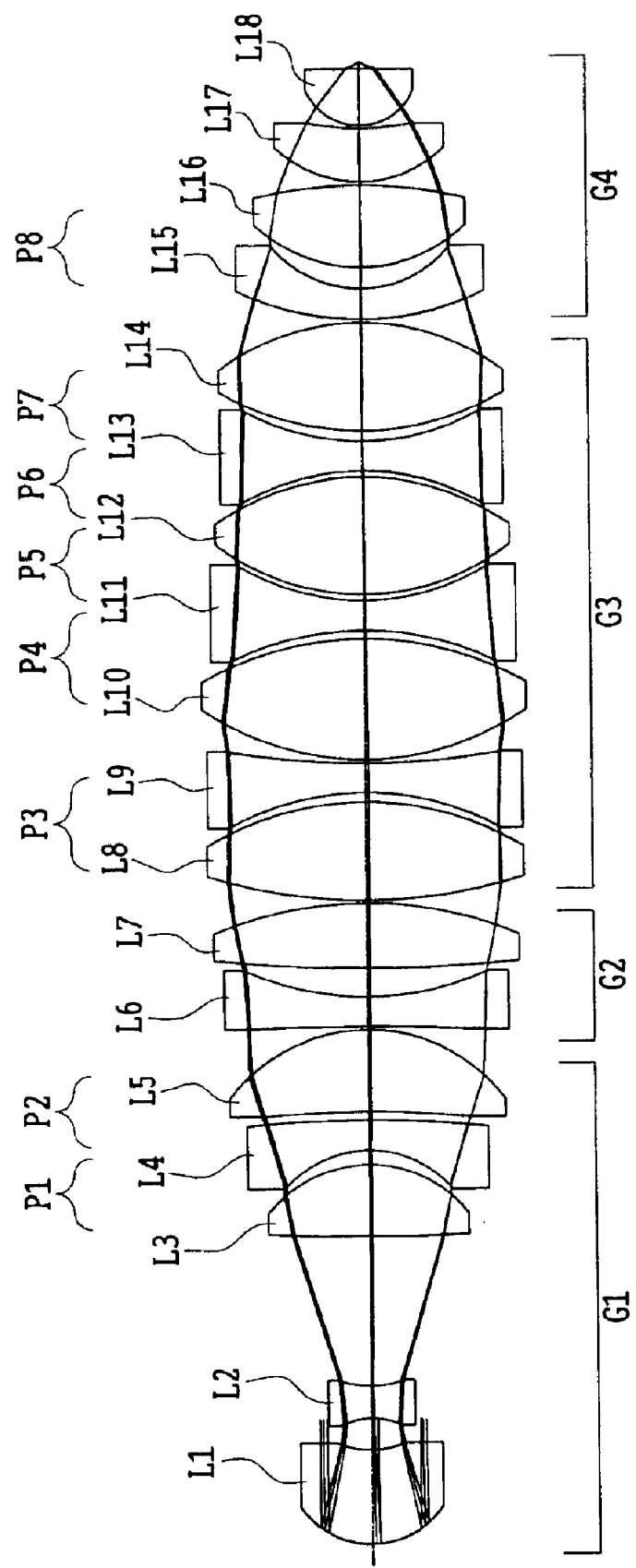
FIG. 3 is a view showing a lens arrangement of a second embodiment in the present invention.
Figure 4:
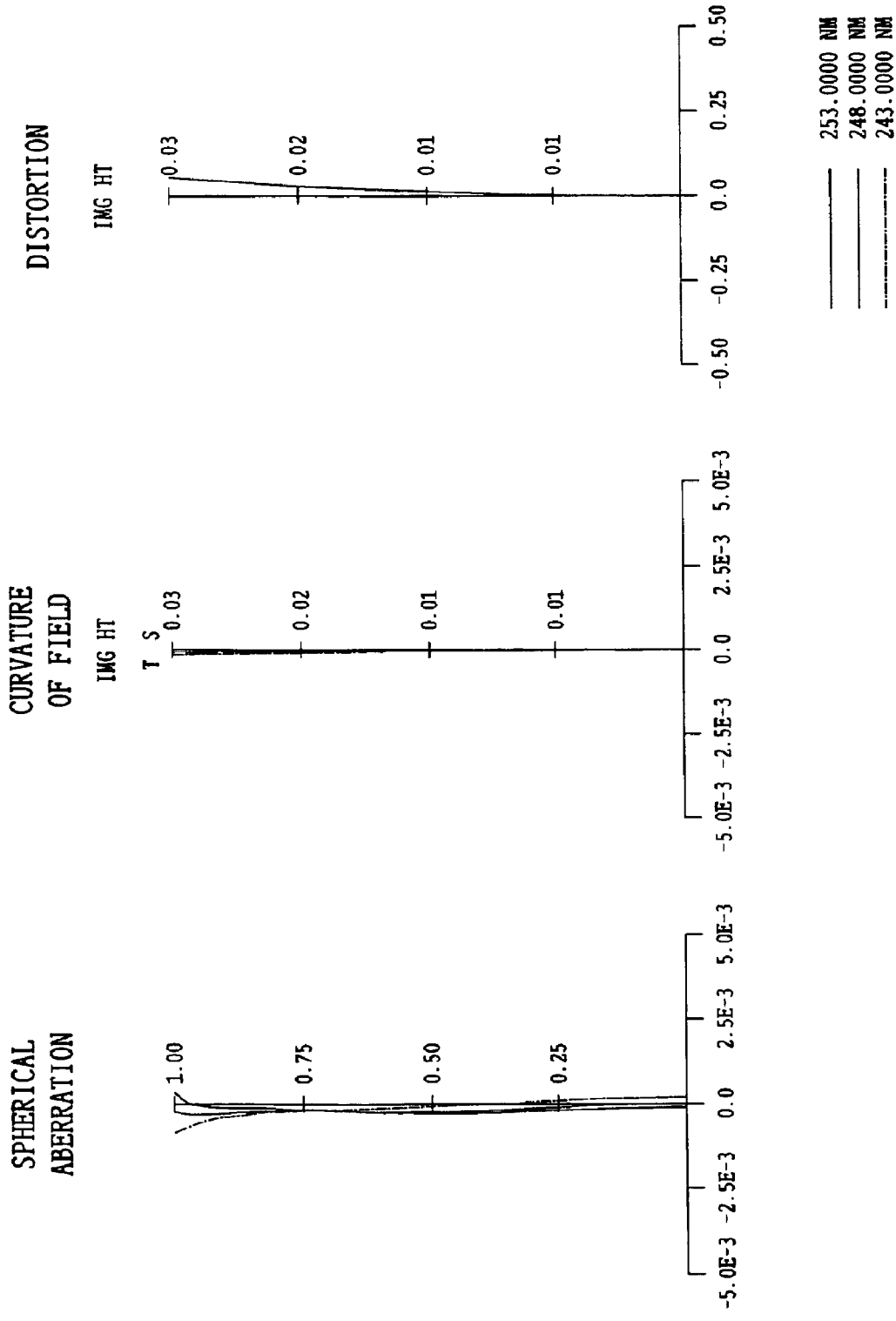
FIG. 4 is aberration diagrams of the second embodiment.

The lens arrangement of the second embodiment is shown in FIG. 3 and aberration characteristics are shown in FIG. 4. As will be obvious from FIG. 3, the first lens unit G1 of the second embodiment includes, in order from the image side, the positive meniscus lens L1 with a convex surface facing the image side, the negative lens L2, the positive lens L3, the negative lens L4, and the positive lens L5. Two pairs of lenses P1 and P2 are configured with three adjacent lenses L3–L5 to constitute a false cemented triplet, and the first lens unit G1 has negative power as a whole.

The second lens unit G2 includes the biconcave negative lens L6 and the biconvex positive lens L7, and the radius of curvature of the surface of the negative lens L6, adjacent to the positive lens L7 in the same lens unit, is selected to be smaller than that of the opposite surface thereof.

The third lens unit G3 includes four biconvex positive lenses L8, L10, L12, and L14 and three biconcave negative lenses L9, L11, and L13 in which each of the biconvex positive lenses and each of the biconcave negative lenses have different media and are alternately arranged, so that the biconvex positive lenses L8 and L14 are arranged on the image side and the object side, respectively. In addition, the pair of lenses P3 are configured with two adjacent lenses L8 and L9 to constitute a false cemented doublet, and four pairs of lenses P4, P5, P6, and P7 are configured with five lenses L10–L14 to constitute false cemented triplets. The third lens unit G3 has positive power as a whole.

The fourth lens unit G4 includes the negative meniscus lens L15 with a concave surface facing the object side, the biconvex positive lens L16, and the positive meniscus lenses L17 and L18, each with a convex surface facing the image side. The pair of lenses P8 are configured with two adjacent lenses L15 and L16 to constitute a false cemented doublet, and the fourth lens unit G4 has positive power as a whole.

As will be evident from Data 2 to be described below, the second embodiment satisfies Conditions (1), (2), (3), and (6), the pairs of lenses P1–P8 satisfy Conditions (4) and (5), and the imaging position of wavefront aberration on the object side in the deep ultraviolet region and the infrared region satisfies Condition (7).

Data 2
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 1 | INFINITY | −4 | | | |
| 2 | 2.7384 | 3.051628 | Quartz L1 | | |
| 3 | 2.53121 | 1 | | | |
| 4 | −2.1847 | 1.047705 | Quartz L2 | | |
| 5 | 2.86499 | 4.886075 | | | |
| 6 | 56.70556 | 2.334353 | Fluorite L3 | | |
| 7 | −3.99727 | 0.495399 | P1 | 0.0110 | 1.186 |
| 8 | −3.37138 | 1 | Quartz L4 | | |
| 9 | −48.98121 | 0.280628 | P2 | 0.0062 | 0.835 |
| 10 | −40.90839 | 2.734155 | Fluorite L5 | | |
| 11 | −5.36137 | 0.1 | | | |
| 12 | −112.9024 | 1 | Quartz L6 | | |
| 13 | 8.7118 | 0.977655 | | | |
| 14 | 44.19142 | 2.184896 | Fluorite L7 | | |
| 15 | −12.32926 | 0.1 | | | |
| 16 | 15.55116 | 3.305937 | Fluorite L8 | | |
| 17 | −9.72897 | 0.320949 | P3 | 0.0071 | 1.116 |
| 18 | −8.71964 | 1 | Quartz L9 | | |
| 19 | 24.0111 | 0.1 | | | |
| 20 | 8.64398 | 4.054088 | Fluorite L10 | | |
| 21 | −10.49908 | 0.297857 | P4 | 0.0066 | 1.105 |
| 22 | −9.50178 | 1 | Quartz L11 | | |
| 23 | 7.11952 | 0.209897 | P5 | 0.0047 | 1.027 |
| 24 | 7.31004 | 3.925088 | Fluorite L12 | | |
| 25 | −8.00503 | 0.200654 | P6 | 0.0045 | 1.040 |
| 26 | −7.70025 | 0.96 | Quartz L13 | | |
| 27 | 7.18457 | 0.376765 | P7 | 0.0084 | 1.180 |
| 28 | 8.47627 | 3.566291 | Fluorite L14 | | |
| 29 | −7.54149 | 0.1 | | | |
| 30 | 8.54606 | 1 | Quartz L15 | | |
| 31 | 3.58988 | 0.685352 | P8 | 0.0152 | 1.320 |
| 32 | 4.73777 | 2.692071 | Fluorite L16 | | |
| 33 | −15.80256 | 0.1 | | | |
| 34 | 3.77816 | 1.763192 | Fluorite L17 | | |
| 35 | 8.04338 | 0.1 | | | |
| 36 | 1.86328 | 1.807165 | Quartz L18 | | |
| 37 | 54.41499 | 0.242201 | | | |

FL1 = −50
FL2 = −118.549
FL3 = 17.046
FL234 = −9.710
Rmin = 8.7118
Rmax = 44.19142

| wavelength used for AF | Imaging shift at the best position of wavefront aberration on the object side between 248 nm and each wavelength used for AF |
|---|---|
| 670 nm | +4.04 μm |
| 785 nm | +0.35 μm |
| 900 nm | −6.14 μm |

Third Embodiment

Figure 5:
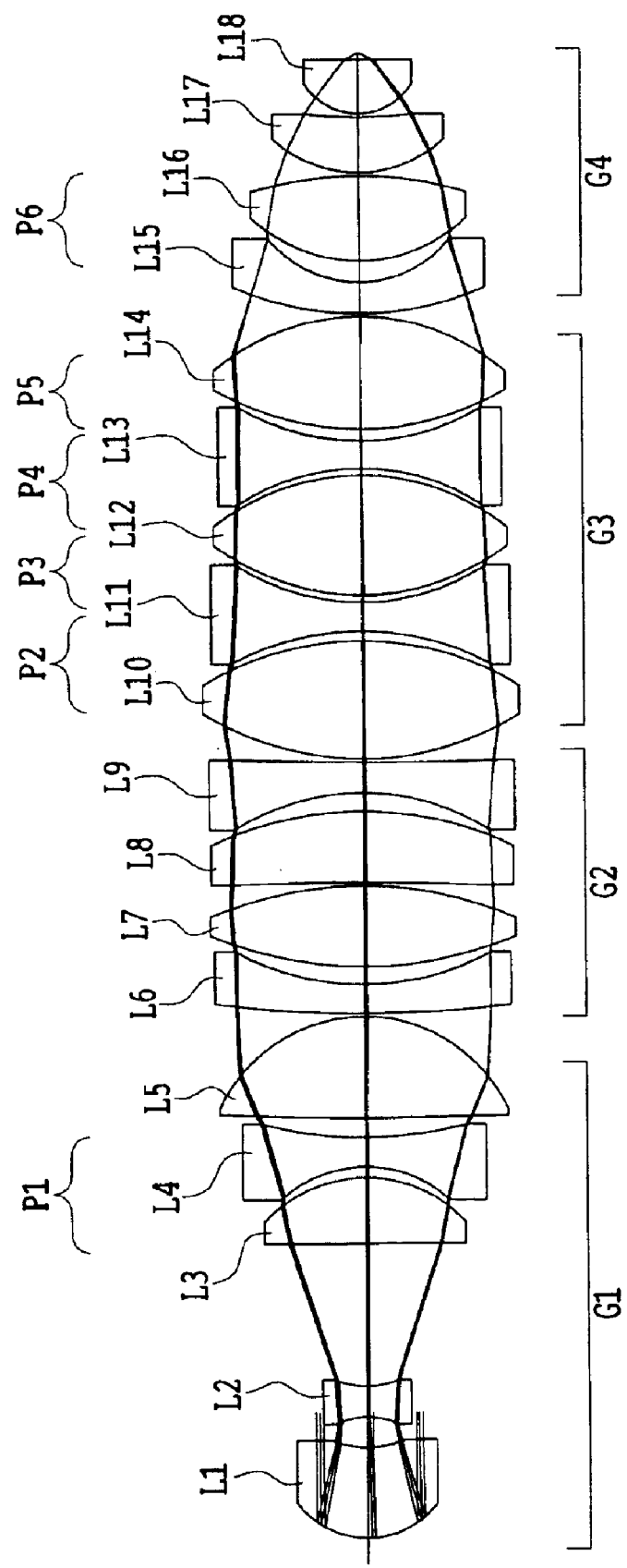
FIG. 5 is a view showing a lens arrangement of a third embodiment in the present invention.
Figure 6:
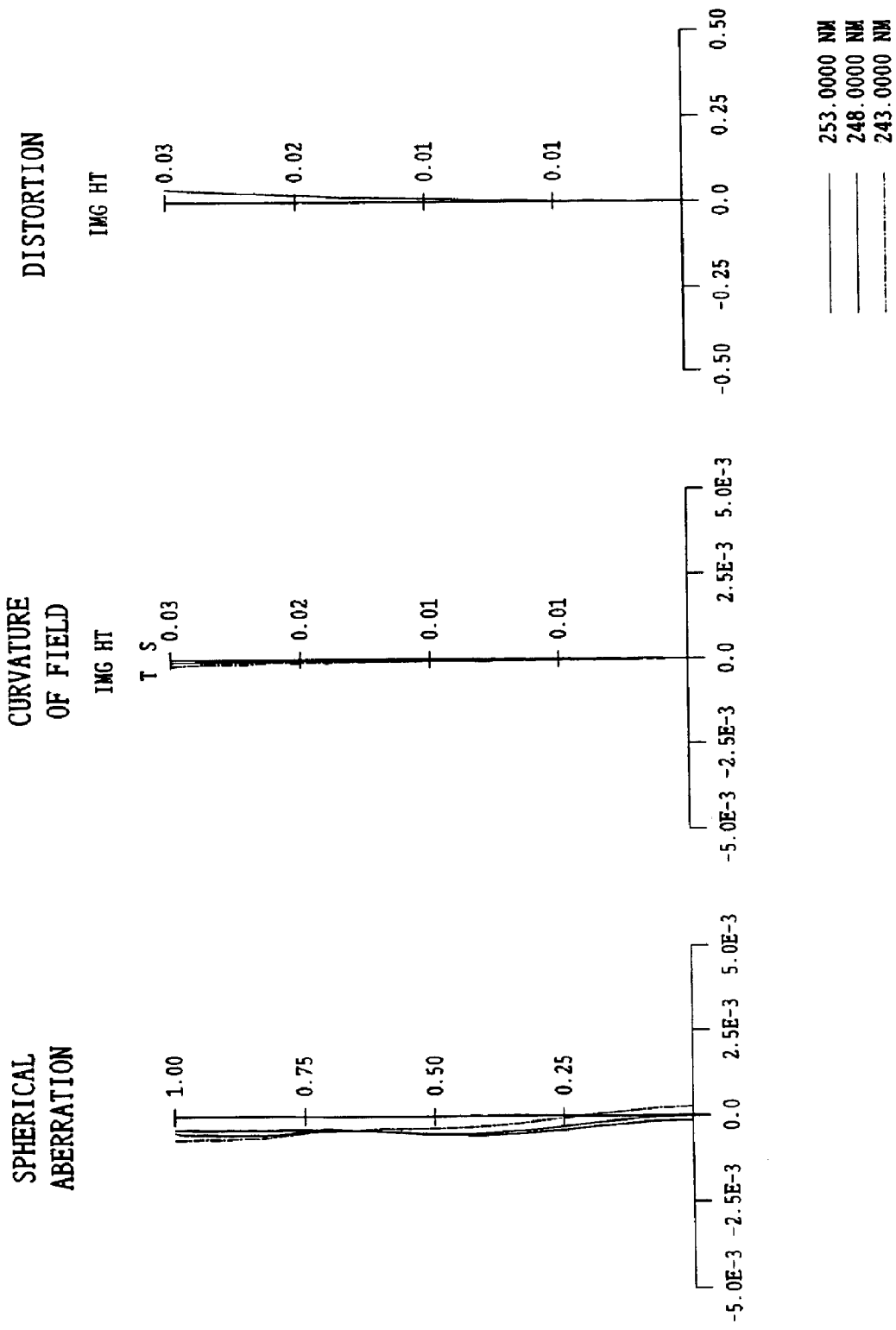
FIG. 6 is aberration diagrams of the third embodiment.

The lens arrangement of the third embodiment is shown in FIG. 5 and aberration characteristics are shown in FIG. 6. As will be obvious from FIG. 5, the first lens unit G1 of the third embodiment includes, in order from the image side, the positive meniscus lens L1 with a convex surface facing the image side, the negative lens L2, the positive lens L3, the negative lens L4, and the positive lens L5. The pair of lenses P1 are configured with two adjacent lenses L3 and L4 to constitute a false cemented doublet, and the first lens unit G1 has negative power as a whole.

The second lens unit G2 includes the negative meniscus lens L6 with a concave surface facing the object side, the biconvex positive lens L7, the positive meniscus lens L8 with a convex surface facing the object side, and the biconcave negative lens L9, and the radius of curvature of the surface of each of the first negative lens L6 and the second negative lens L9, adjacent to the positive lens in the same lens unit, is selected to be smaller than that of the opposite surface thereof.

The third lens unit G3 includes three biconvex positive lenses L10, L12, and L14 and two biconcave negative lenses L11 and L13 in which each of the biconvex positive lenses and each of the biconcave negative lenses have different media and are alternately arranged, so that the biconvex positive lenses L10 and L14 are arranged on the image side and the object side, respectively. In addition, four pairs of lenses P2, P3, P4, and P5 are configured with these five adjacent lenses L10–L14 to constitute false cemented triplets, and the third lens unit G3 has positive power as a whole.

The fourth lens unit G4 includes the negative meniscus lens L15 with a concave surface facing the object side, the biconvex positive lens L16, and the positive meniscus lenses L17 and L18, each with a convex surface facing the image side. The pair of lenses P6 are configured with the lenses L15 and L16 to constitute a false cemented doublet, and the fourth lens unit G4 has positive power as a whole.

As will be evident from Data 3 to be described below, the third embodiment satisfies Conditions (1), (2), (3), and (6), the pairs of lenses P1–P6 satisfy Conditions (4) and (5), and the imaging position of wavefront aberration on the object side in the deep ultraviolet region and the infrared region satisfies Condition (7).

Data 3
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 1 | INFINITY | −4 | | | |
| 2 | 2.73864 | 2.905691 | Quartz L1 | | |
| 3 | 2.58448 | 1 | | | |
| 4 | −2.33399 | 1 | Quartz L2 | | |

-continued

Data 3
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 5 | 2.74587 | 4.60997 | | | |
| 6 | 111.16539 | 2.171309 | Fluorite L3 | | |
| 7 | −4.40895 | 0.364855 | P1 | 0.0081 | 1.102 |
| 8 | −3.99917 | 1 | Quartz L4 | | |
| 9 | 12.05086 | 0.651716 | | | |
| 10 | 88.43996 | 3.353388 | Fluorite L5 | | |
| 11 | −5.03227 | 0.1 | | | |
| 12 | 32.23164 | 1 | Quartz L6 | | |
| 13 | 8.1197 | 0.591245 | | | |
| 14 | 12.03154 | 2.747198 | Fluorite L7 | | |
| 15 | −11.83617 | 0.1 | | | |
| 16 | −154.9676 | 2.377842 | Fluorite L8 | | |
| 17 | −10.73268 | 0.649676 | | | |
| 18 | −7.22798 | 1 | Quartz L9 | | |
| 19 | 78.57585 | 0.1 | | | |
| 20 | 8.92775 | 3.974339 | Fluorite L10 | | |
| 21 | −9.61008 | 0.311032 | P2 | 0.0069 | 1.114 |
| 22 | −8.62521 | 1 | Quartz L11 | | |
| 23 | 7.11859 | 0.200013 | P3 | 0.0044 | 1.021 |
| 24 | 7.27162 | 4.006314 | Fluorite L12 | | |
| 25 | −7.45452 | 0.2 | P4 | 0.0044 | 1.039 |
| 26 | −7.17335 | 0.96 | Quartz L13 | | |
| 27 | 7.36105 | 0.347197 | P5 | 0.0077 | 1.169 |
| 28 | 8.60817 | 3.72229 | Fluorite L14 | | |
| 29 | −7.10645 | 0.1 | | | |
| 30 | 9.71336 | 1 | Quartz L15 | | |
| 31 | 3.61075 | 0.686382 | P6 | 0.0153 | 1.318 |
| 32 | 4.75808 | 2.775991 | Fluorite L16 | | |
| 33 | −12.71179 | 0.1 | | | |
| 34 | 3.89726 | 1.801922 | Fluorite L17 | | |
| 35 | 11.53447 | 0.1 | | | |
| 36 | 1.99349 | 1.750459 | Quartz L18 | | |
| 37 | 104.07304 | 0.241172 | | | |

FL1 = −33.502
FL2 = 443.557
FL3 = 15.410
FL234 = 6.788

| wavelength used for AF | Imaging shift at the best position of wavefront aberration on the object side between 248 nm and each wavelength used for AF |
|---|---|
| 670 nm | −0.61 μm |
| 785 nm | +3.93 μm |
| 900 nm | −6.58 μm |

Rmin1 = 8.1197
Rmax1 = 12.03154
Rmin2 = −7.22798
Rmax2 = −10.73268

Fourth Embodiment

Figure 7:
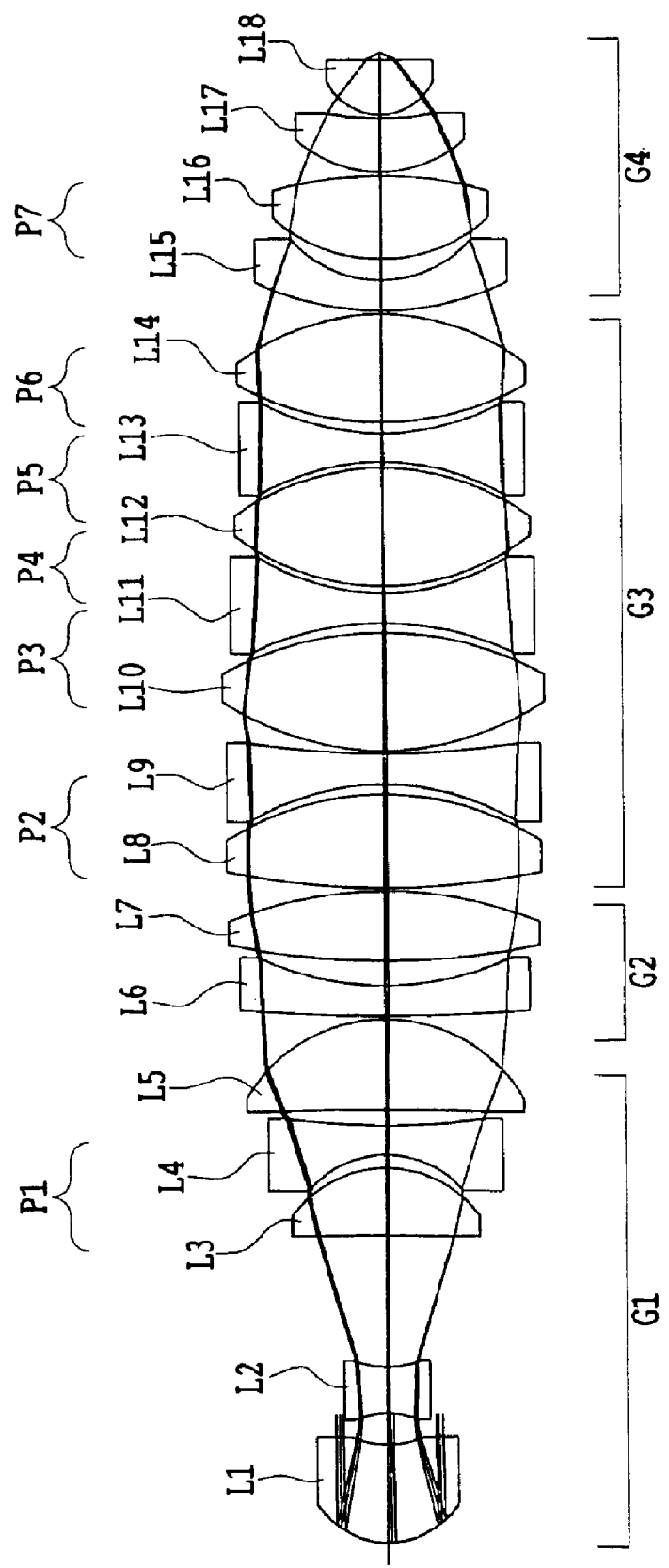
FIG. 7 is a view showing a lens arrangement of a fourth embodiment in the present invention.
Figure 8:
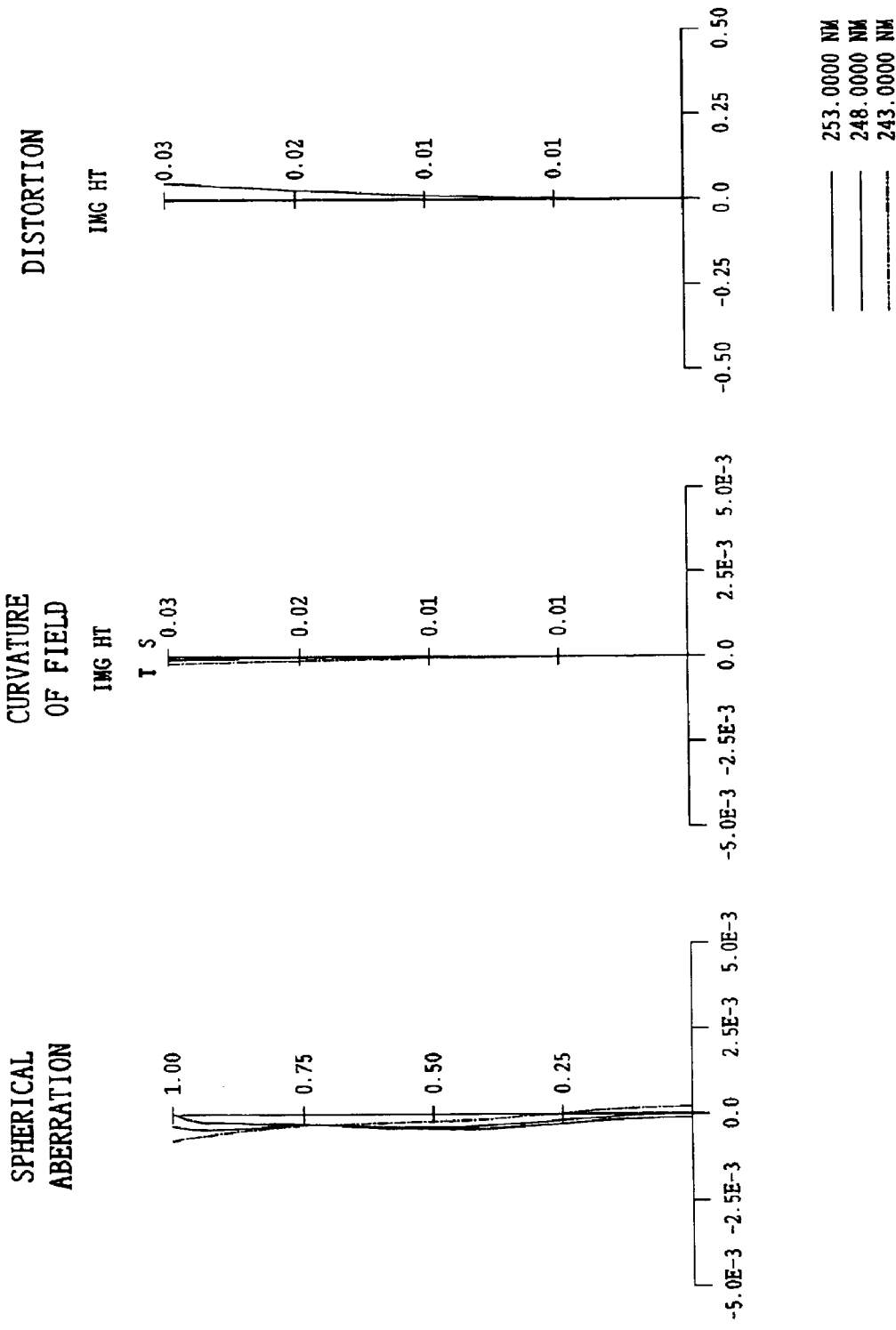
FIG. 8 is aberration diagrams of the fourth embodiment.

The lens arrangement of the fourth embodiment is shown in FIG. 7 and aberration characteristics are shown in FIG. 8. As will be obvious from FIG. 7, the first lens unit G1 of the fourth embodiment includes, in order from the image side, the positive meniscus lens L1 with a convex surface facing the image side, the negative lens L2, the positive lens L3, the negative lens L4, and the positive lens L5. The pair of lenses P1 are configured with two adjacent lenses L3 and L4 to constitute a false cemented doublet, and the first lens unit G1 has negative power as a whole.

The second lens unit G2 includes the negative meniscus lens L6 with a concave surface facing the object side and the biconvex positive lens L7, and the radius of curvature of the surface of the negative lens L6, adjacent to the positive lens L7 in the same lens unit, is selected to be smaller than that of the opposite surface thereof.

The third lens unit G3 includes four biconvex positive lenses L8, L10, L12, and L14 and three biconcave negative lenses L9, L11, and L13, and has positive power as a whole. Each of the biconvex positive lenses and each of the biconcave negative lenses have different media and are alternately arranged. The biconvex positive lenses L8 and L14 are arranged on the image side and the object side, respectively. In addition, the pair of lenses P2 are configured with two adjacent lenses L8 and L9 to constitute a false cemented doublet. Four pairs of lenses P3, P4, P5, and P6 are configured with five lenses L10–L14 to constitute false cemented triplets.

The fourth lens unit G4 includes the negative meniscus lens L15 with a concave surface facing the object side, the biconvex positive lens L16, the positive meniscus lenses L17 with a convex surface facing the image side, and the positive lens L18. The pair of lenses P7 are configured with the lenses L15 and L16 to constitute a false cemented doublet, and the fourth lens unit G4 has positive power as a whole.

As will be evident from Data 4 to be described below, the fourth embodiment satisfies Conditions (1), (2), (3), and (6), the pairs of lenses P1–P7 satisfy Conditions (4) and (5), and the imaging position of wavefront aberration on the object side in the deep ultraviolet region and the infrared region satisfies Condition (7).

Data 4
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 1 | INFINITY | −4 | | | |
| 2 | 2.81397 | 3.09206 | Quartz L1 | | |
| 3 | 2.76385 | 1 | | | |
| 4 | −2.31856 | 1.492274 | Quartz L2 | | |
| 5 | 2.7277 | 4.262613 | | | |
| 6 | −75.21087 | 2.180498 | Fluorite L3 | | |
| 7 | −3.71239 | 0.42553 | P1 | 0.0095 | 1.143 |
| 8 | −3.24702 | 1 | Quartz L4 | | |
| 9 | 23.08615 | 0.509333 | | | |
| 10 | −136.3743 | 3.049067 | Fluorite L5 | | |
| 11 | −4.95289 | 0.1 | | | |
| 12 | 59.70625 | 1 | Quartz L6 | | |
| 13 | 8.70576 | 0.810219 | | | |
| 14 | 21.37872 | 2.373098 | Fluorite L7 | | |
| 15 | −12.69628 | 0.1 | | | |
| 16 | 23.97133 | 3.159241 | Fluorite L8 | | |
| 17 | −8.70394 | 0.314847 | P2 | 0.0070 | 1.107 |
| 18 | −7.85928 | 1 | Quartz L9 | | |
| 19 | 24.51209 | 0.1 | | | |
| 20 | 8.67237 | 3.972724 | Fluorite L10 | | |
| 21 | −10.43664 | 0.333853 | P3 | 0.0074 | 1.142 |
| 22 | −9.14266 | 1 | Quartz L11 | | |
| 23 | 7.13901 | 0.198711 | P4 | 0.0044 | 1.020 |
| 24 | 7.2852 | 3.942702 | Fluorite L12 | | |
| 25 | −7.84279 | 0.193868 | P5 | 0.0043 | 1.033 |
| 26 | −7.59235 | 0.96 | Quartz L13 | | |
| 27 | 7.6216 | 0.3644 | P6 | 0.0081 | 1.186 |
| 28 | 9.04242 | 3.54172 | Fluorite L14 | | |
| 29 | −7.48584 | 0.1 | | | |
| 30 | 8.84686 | 1 | Quartz L15 | | |
| 31 | 3.69613 | 0.705709 | P7 | 0.0157 | 1.349 |

-continued

Data 4
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 32 | 4.98561 | 2.714623 | Fluorite L16 | | |
| 33 | −13.30046 | 0.1 | | | |
| 34 | 3.89708 | 1.765252 | Fluorite L17 | | |
| 35 | 8.91324 | 0.1 | | | |
| 36 | 1.90219 | 1.794209 | Quartz L18 | | |
| 37 | 34.95039 | 0.24345 | | | |

FL1 = −23.968
FL2 = 77.984
FL3 = 18.192
FL234 = 7.088
Rmin = 8.70576
Rmax = 21.37872

| wavelength used for AF | Imaging shift at the best position of wavefront aberration on the object side between 248 nm and each wavelength used for AF |
|---|---|
| 670 nm | +3.90 μm |
| 785 nm | −0.55 μm |
| 900 nm | −6.24 μm |

Fifth Embodiment

Figure 9:
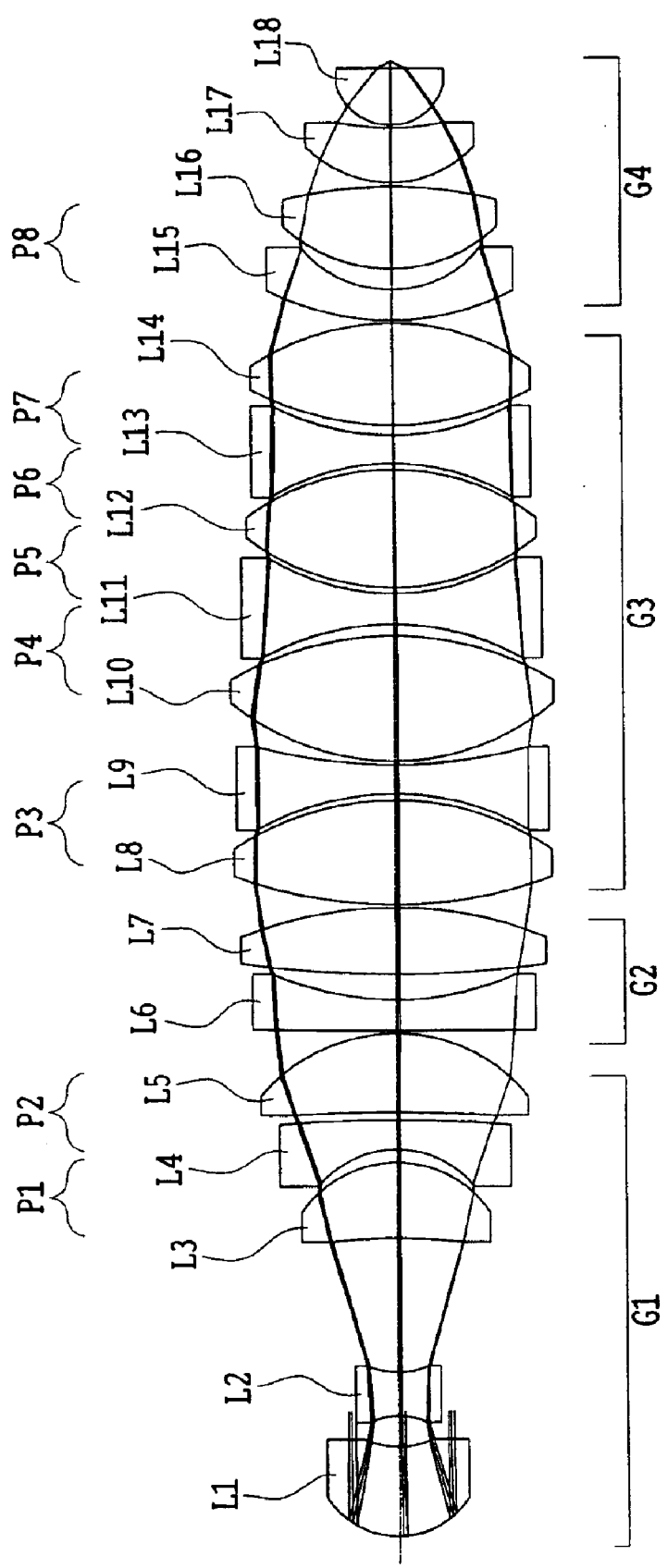
FIG. 9 is a view showing a lens arrangement of a fifth embodiment in the present invention.
Figure 10:
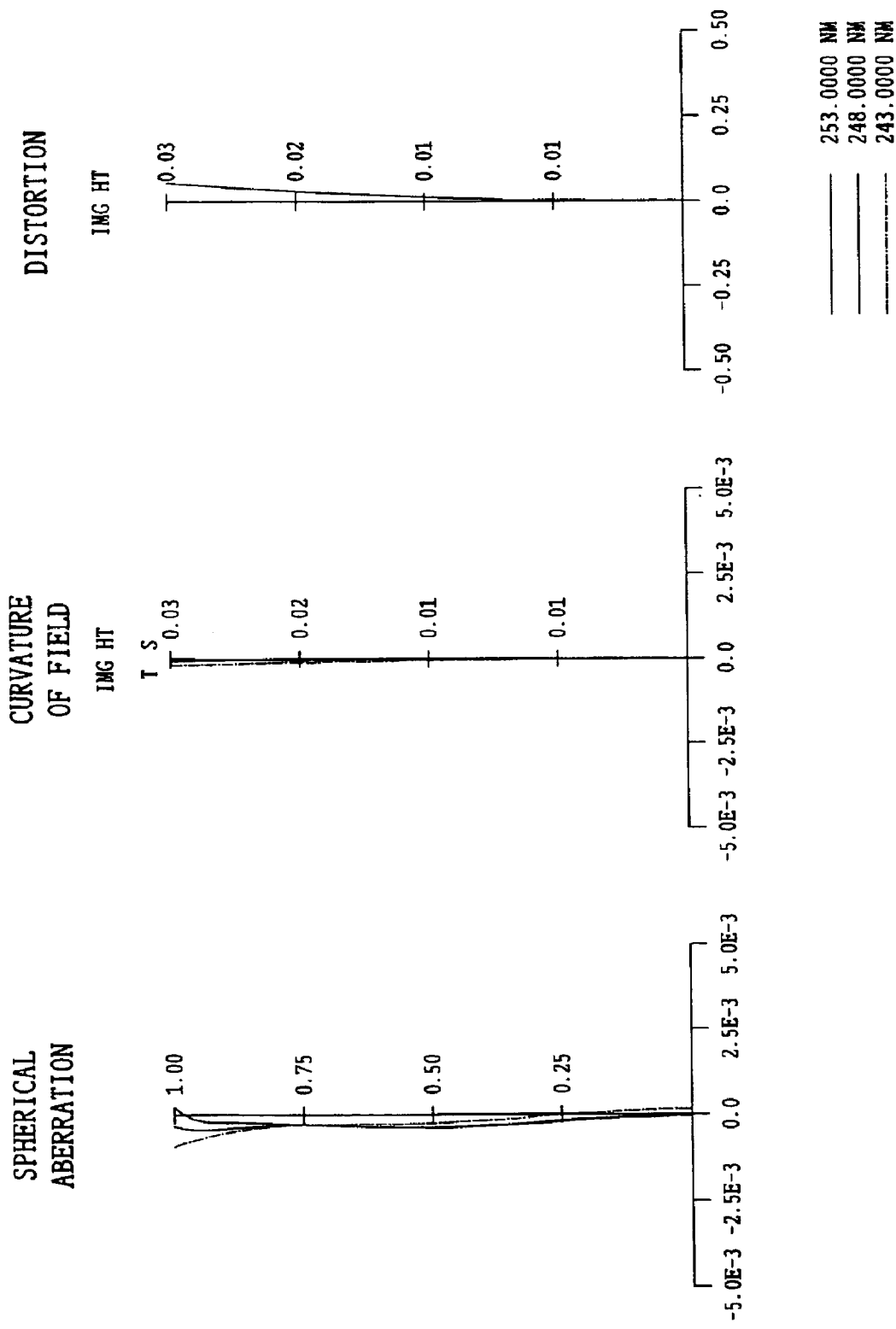
FIG. 10 is aberration diagrams of the fifth embodiment.

The lens arrangement of the fifth embodiment is shown in FIG. 9 and aberration characteristics are shown in FIG. 10. As will be obvious from FIG. 9, the first lens unit G1 of the fifth embodiment includes, in order from the image side, the positive meniscus lens L1 with a convex surface facing the image side, the negative lens L2, the positive lens L3, the negative lens L4, and the positive lens L5. Two pairs of lenses P1 and P2 are configured with three adjacent lenses L3–L5 to constitute a false cemented triplet, and the first lens unit G1 has negative power as a whole.

The second lens unit G2 includes the negative meniscus lens L6 with a concave surface facing the object side and the biconvex positive lens L7, and the radius of curvature of the surface of the negative lens L6, adjacent to the positive lens L7 in the same lens unit, is selected to be smaller than that of the opposite surface thereof.

The third lens unit G3 includes four biconvex positive lenses L8, L10, L12, and L14 and three biconcave negative lenses L9, L11, and L13 in which each of the biconvex positive lenses and each of the biconcave negative lenses have different media and are alternately arranged, so that the biconvex positive lenses L8 and L14 are arranged on the image side and the object side, respectively. In addition, the pair of lenses P3 are configured with two adjacent lenses L8 and L9 to constitute a false cemented doublet, and four pairs of lenses P4, P5, P6, and P7 are configured with five lenses L10–L14 to constitute false cemented triplets. The third lens unit G3 has positive power as a whole.

The fourth lens unit G4 includes the negative meniscus lens L15 with a concave surface facing the object side, the biconvex positive lens L16, and the positive meniscus lenses L17 and L18, each with a convex surface facing the image side. The pair of lenses P8 are configured with the lenses L15 and L16 to constitute a false cemented doublet, and the fourth lens unit G4 has positive power as a whole.

As will be evident from Data 5 to be described below, the fifth embodiment satisfies Conditions (1), (2), (3), and (6), the pairs of lenses P1–P8 satisfy Conditions (4) and (5), and the imaging position of wavefront aberration on the object side in the deep ultraviolet region and the infrared region satisfies Condition (7).

Data 5
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 1 | INFINITY | −4 | | | |
| 2 | 2.71159 | 2.905407 | Quartz L1 | | |
| 3 | 2.78435 | 1 | | | |
| 4 | −2.31651 | 1.412157 | Quartz L2 | | |
| 5 | 2.7253 | 4.418894 | | | |
| 6 | −18.87975 | 2.487348 | Fluorite L3 | | |
| 7 | −3.62417 | 0.433359 | P1 | 0.0096 | 1.135 |
| 8 | −3.19218 | 1 | Quartz L4 | | |
| 9 | −61.99509 | 0.25793 | P2 | 0.0057 | 0.981 |
| 10 | −60.81569 | 2.678607 | Fluorite L5 | | |
| 11 | −5.47827 | 0.1 | | | |
| 12 | 220.57961 | 1 | Quartz L6 | | |
| 13 | 9.08685 | 0.879978 | | | |
| 14 | 31.41704 | 2.225112 | Fluorite L7 | | |
| 15 | −13.39864 | 0.1 | | | |
| 16 | 14.01766 | 3.54376 | Fluorite L8 | | |
| 17 | −9.08325 | 0.214654 | P3 | 0.0048 | 1.035 |
| 18 | −8.77543 | 1 | Quartz L9 | | |
| 19 | 15.73139 | 0.1 | | | |
| 20 | 7.76576 | 4.277461 | Fluorite L10 | | |
| 21 | −10.30516 | 0.393835 | P4 | 0.0088 | 1.201 |
| 22 | −8.57884 | 1 | Quartz L11 | | |
| 23 | 7.171 | 0.200263 | P5 | 0.0045 | 1.021 |
| 24 | 7.32009 | 3.935647 | Fluorite L12 | | |
| 25 | −7.89289 | 0.200186 | P6 | 0.0044 | 1.040 |
| 26 | −7.59194 | 0.96 | Quartz L13 | | |
| 27 | 8.07009 | 0.313274 | P7 | 0.0070 | 1.131 |
| 28 | 9.12468 | 3.384142 | Fluorite L14 | | |
| 29 | −8.12096 | 0.1 | | | |
| 30 | 8.60096 | 1 | Quartz L15 | | |
| 31 | 3.67872 | 0.702655 | P8 | 0.0156 | 1.343 |
| 32 | 4.94159 | 2.700085 | Fluorite L16 | | |
| 33 | −14.70578 | 0.1 | | | |
| 34 | 3.73742 | 1.791677 | Fluorite L17 | | |
| 35 | 7.85852 | 0.1 | | | |
| 36 | 1.84237 | 1.836756 | Quartz L18 | | |
| 37 | 17.62537 | 0.246814 | | | |

FL1 = −20.6369
FL2 = 1845.95
FL3 = 17.640
FL234 = 7.377
Rmin = 9.08685
Rmax = 31.41704

| wavelength used for AF | Imaging shift at the best position of wavefront aberration on the object side between 248 nm and each wavelength used for AF |
|---|---|
| 670 nm | +4.22 μm |
| 785 nm | −0.20 μm |
| 900 nm | −6.03 μm |

Sixth Embodiment

Figure 11:
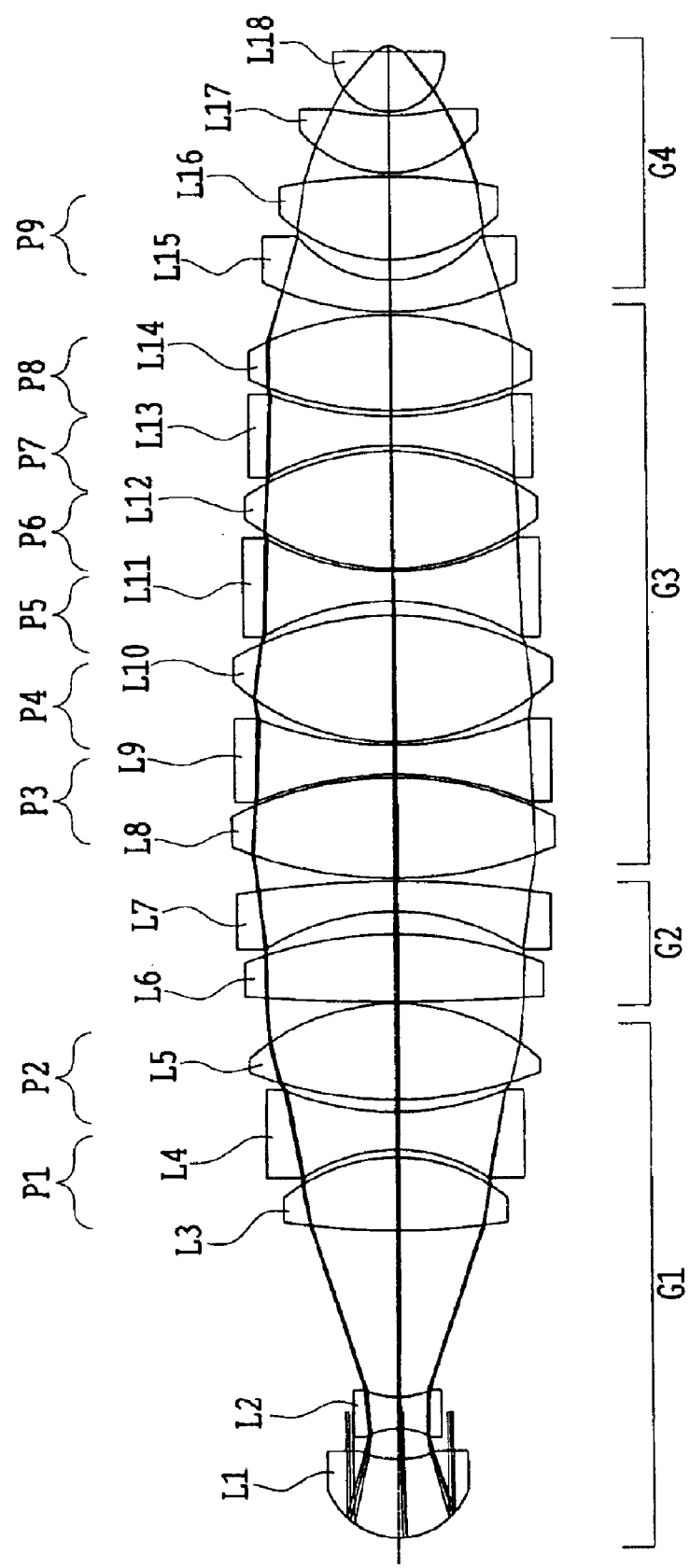
FIG. 11 is a view showing a lens arrangement of a sixth embodiment in the present invention.
Figure 12:
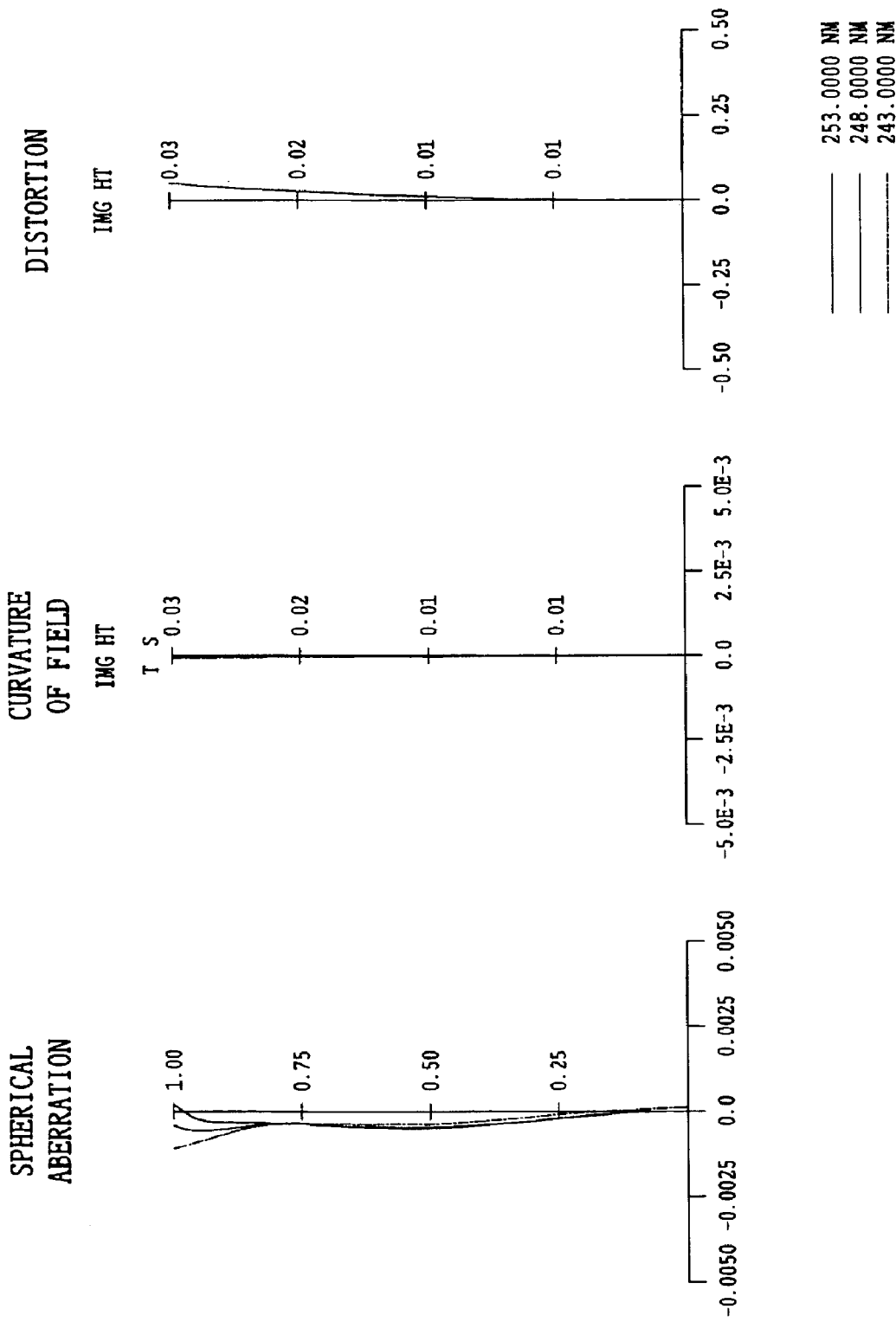
FIG. 12 is aberration diagrams of the sixth embodiment.

The lens arrangement of the sixth embodiment is shown in FIG. 11 and aberration characteristics are shown in FIG. 12. As will be obvious from FIG. 11, the first lens unit G1 of the sixth embodiment includes, in order from the image side, the positive meniscus lens L1 with a convex surface facing the image side, the negative lens L2, the positive lens L3, the negative lens L4, and the positive lens L5. Two pairs of lenses P1 and P2 are configured with three adjacent lenses L3–L5 to constitute a false cemented triplet, and the first lens unit G1 has negative power as a whole.

The second lens unit G2 includes the biconvex positive lens L6 and the negative meniscus lens L7 with a concave surface facing the image side, and the radius of curvature of the surface of the negative lens L7, adjacent to the positive lens L6 in the same lens unit, is selected to be smaller than that of the opposite surface thereof.

The third lens unit G3 includes four biconvex positive lenses L8, L10, L12, and L14 and three biconcave negative lenses L9, L11, and L13 in which each of the biconvex positive lenses and each of the biconcave negative lenses have different media and are alternately arranged, so that the biconvex positive lenses L8 and L14 are arranged on the image side and the object side, respectively. In addition, six pairs of lenses P3, P4, P5, P6, P7, and P8 are configured with these seven adjacent lenses L8–L14 to constitute false cemented triplets, and the third lens unit G3 has positive power as a whole.

The fourth lens unit G4 includes the negative meniscus lens L15 with a concave surface facing the object side, the biconvex positive lens L16, and the positive meniscus lenses L17 and L18, each with a convex surface facing the image side. The lenses L15 and L16 are configured as the pair of lenses P9 to constitute a false cemented doublet, and the fourth lens unit G4 has positive power as a whole.

As will be evident from Data 6 to be described below, the sixth embodiment satisfies Conditions (1), (2), (3), and (6), the pairs of lenses P1–P9 satisfy Conditions (4) and (5), and the imaging position of wavefront aberration on the object side in the deep ultraviolet region and the infrared region satisfies Condition (7).

Data 6
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 1 | INFINITY | −4 | | | |
| 2 | 2.40698 | 2.481247 | Quartz L1 | | |
| 3 | 2.4729 | 1 | | | |
| 4 | −2.06668 | 1.00205 | Quartz L2 | | |
| 5 | 2.43139 | 5.396129 | | | |
| 6 | 20.17433 | 2.407156 | Fluorite L3 | | |
| 7 | −5.53323 | 0.259513 | P1 | 0.0058 | 1.017 |
| 8 | −5.44118 | 1.24444 | Quartz L4 | | |
| 9 | 8.91162 | 0.401085 | P2 | 0.0089 | 1.357 |
| 10 | 12.09094 | 3.156645 | Fluorite L5 | | |
| 11 | −7 | 0.1 | | | |
| 12 | 61.22577 | 2.241903 | Fluorite L6 | | |
| 13 | −12.63263 | 0.757738 | | | |
| 14 | −7.52366 | 1 | Quartz L7 | | |
| 15 | −31.66303 | 0.1 | | | |
| 16 | 12.668 | 3.389652 | Fluorite L8 | | |
| 17 | −11.03464 | 0.1 | P3 | 0.0022 | 0.969 |
| 18 | −11.38305 | 1 | Quartz L9 | | |
| 19 | 11.02999 | 0.1 | P4 | 0.0022 | 0.682 |
| 20 | 7.52787 | 4.19599 | Fluorite L10 | | |
| 21 | −10.19725 | 0.484353 | P5 | 0.0108 | 1.293 |
| 22 | −7.8871 | 1 | Quartz L11 | | |
| 23 | 7.89473 | 0.1 | P6 | 0.0022 | 0.951 |
| 24 | 7.50757 | 3.837795 | Fluorite L12 | | |

-continued

Data 6
Parfocal distance = 45 mm
Range of correction for aberration in deep
ultraviolet region = 248 nm ± 5 nm
NA = 0.9
WD = 0.2

| Surface number | RDY | THI | Medium | Condition (4) | Condition (5) |
|---|---|---|---|---|---|
| 25 | −8.29073 | 0.200736 | P7 | 0.0045 | 1.036 |
| 26 | −8.00414 | 0.96 | Quartz L13 | | |
| 27 | 10.08674 | 0.20286 | P8 | 0.0045 | 1.017 |
| 28 | 10.2603 | 3.160175 | Fluorite L14 | | |
| 29 | −9.13166 | 0.1 | | | |
| 30 | 8.6418 | 1 | Quartz L15 | | |
| 31 | 3.72211 | 0.672984 | P9 | 0.0150 | 1.304 |
| 32 | 4.85348 | 2.69256 | Fluorite L16 | | |
| 33 | −21.05717 | 0.1 | | | |
| 34 | 3.59888 | 1.866016 | Fluorite L17 | | |
| 35 | 7.37659 | 0.1 | | | |
| 36 | 1.77692 | 1.931898 | Quartz L18 | | |
| 37 | 7.15061 | 0.257076 | | | |

FL1 = −32.892
FL2 = −211.743
FL3 = 18.024
FL234 = 6.493
Rmin = −7.52366
Rmax = −12.63263

| wavelength used for AF | Imaging shift at the best position of wavefront aberration on the object side between 248 nm and each wavelength used for AF |
|---|---|
| 670 nm | +3.31 μm |
| 785 nm | −1.26 μm |
| 900 nm | −7.25 μm |

According to the present invention, as will be evident from the above description, a high-NA deep ultraviolet object can be provided in which chromatic aberration can be corrected without using any cemented lens, the resolution is greatly improved in order to accommodate a fine structure required for a high-integration semi-conductor and a mass-storage optical media, focusing is performed instantaneously by making AF possible, and excellent imaging performance is maintained with respect to the manufacturing error.

What is claimed is:

1. An objective having lens units, each of which is constructed with single lenses, and a numerical aperture of 0.7 or more, the objective comprising, in order from an image side:

a first lens unit including a positive meniscus lens with a convex surface facing an image side, at least two negative lenses, and at least two positive lenses, and having negative power as a whole;

a second lens unit including a negative lens and a positive lens so that a radius of curvature of a surface of the negative lens, adjacent to the positive lens, is smaller than a radius of curvature of an opposite surface thereof;

a third lens unit including biconvex positive lenses and biconcave negative lenses which have different media, so that two of the biconvex positive lenses are arranged on the object side and the image side, and having positive power as a whole; and a fourth lens unit including a negative meniscus lens and at least one positive meniscus lens, and having positive power as a whole, the objective satisfying the following condition:

$$0 < |Rmin/Rmax| < 0.5$$

where Rmin is the radius of curvature of the surface of the negative lens, adjacent to the positive lens, in the second lens unit and Rmax is the radius of curvature of the opposite surface thereof.

2. An objective according to claim 1, further satisfying the following condition:

$$1 < |FL2/FL3|$$

where FL2 is a focal length (mm) of the second lens unit and FL3 is a focal length (mm) of the third lens unit.

3. An objective according to claim 1, further satisfying the following condition:

$$-1.5 < FL1/FL234 < -1$$

where FL1 is a focal length (mm) of the first lens unit and FL234 is a synthesized focal length (mm) of the second lens unit to the fourth lens unit.

4. An objective according to claim 1, wherein the single lenses are constructed of quartz and fluorite.

5. An objective according to claim 1, wherein each of the first lens unit, the third lens unit, and the fourth lens unit has air spacing between a positive lens and a negative lens of different media and includes at least one pair of lenses so as to satisfy the following conditions:

$$d/L < 0.025$$

$$0.58 < Rp/Rn < 1.73$$

where L is a parfocal distance (mm) of the objective, d is the air spacing (mm), Rp is a radius of curvature of a surface with positive power, of the positive lens and the negative lens facing each other with air spacing therebetween, and Rn is a radius of curvature of a surface with negative power thereof.

6. An objective according to any one of claims 1–5, wherein at least one pair of lenses are constructed so that a negative lens and a positive lens of different media are arranged with air spacing therebetween, and the negative lens and the positive lens are constructed of quartz and fluorite, respectively.

7. An objective according to any one of claims 1–5, further satisfying the following condition:

$$Ri < Ro$$

where Ri is a radius of curvature of an image-side surface of at least one negative lens in the first lens unit and Ro is a radius of curvature of an object-side surface thereof.

8. An objective according to any one of claims 1–5, further satisfying the following condition:

$$|DUVfp - IRfp| \leq 12 \mu m$$

where DUVfp is an imaging position on the object side in a deep ultraviolet region and IRfp is an imaging position on the object side of wavelength in an infrared region.

* * * * *